US011450925B2

(12) United States Patent
Yu et al.

(10) Patent No.: US 11,450,925 B2
(45) Date of Patent: Sep. 20, 2022

(54) METHOD OF MANUFACTURING ELECTRODE-SEPARATOR COMPOSITE, ELECTRODE-SEPARATOR COMPOSITE MANUFACTURED BY THE MANUFACTURING METHOD AND LITHIUM SECONDARY BATTERY COMPRISING THE SAME

(71) Applicant: LG CHEM, LTD., Seoul (KR)

(72) Inventors: Hyung-Kyun Yu, Daejeon (KR); Sun-Mi Jin, Daejeon (KR); Joo-Sung Lee, Daejeon (KR); Bo-Kyung Ryu, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1050 days.

(21) Appl. No.: 14/772,321

(22) PCT Filed: Oct. 31, 2014

(86) PCT No.: PCT/KR2014/010346
§ 371 (c)(1),
(2) Date: Sep. 2, 2015

(87) PCT Pub. No.: WO2015/065090
PCT Pub. Date: May 7, 2015

(65) Prior Publication Data
US 2015/0380706 A1 Dec. 31, 2015

(30) Foreign Application Priority Data

Oct. 31, 2013 (KR) .................. 10-2013-0131433
Oct. 31, 2014 (KR) .................. 10-2014-0149925

(51) Int. Cl.
| | |
|---|---|
| *H01M 4/139* | (2010.01) |
| *H01M 50/46* | (2021.01) |
| *H01M 4/04* | (2006.01) |
| *H01M 10/052* | (2010.01) |
| *H01M 50/403* | (2021.01) |
| *H01M 50/411* | (2021.01) |
| *H01M 10/058* | (2010.01) |
| *H01M 10/0525* | (2010.01) |

(52) U.S. Cl.
CPC ......... *H01M 50/46* (2021.01); *H01M 4/0404* (2013.01); *H01M 4/0471* (2013.01); *H01M 4/139* (2013.01); *H01M 10/052* (2013.01); *H01M 10/058* (2013.01); *H01M 10/0525* (2013.01); *H01M 50/403* (2021.01); *H01M 50/411* (2021.01); *Y02T 10/70* (2013.01)

(58) Field of Classification Search
CPC ............ H01M 2/1673; H01M 2/145; H01M 10/0525; H01M 10/058
See application file for complete search history.

(56) References Cited

U.S. PATENT DOCUMENTS

| | | | | |
|---|---|---|---|---|
| 8,039,140 B2* | 10/2011 | Lambert | ............... | H01M 2/145 |
| | | | | 429/129 |
| 8,216,712 B1* | 7/2012 | Ramasubramanian | ..................... | |
| | | | | H01M 2/1646 |
| | | | | 429/144 |
| 2005/0186479 A1 | 8/2005 | Totsuka et al. | | |
| 2005/0266150 A1 | 12/2005 | Yong et al. | | |
| 2010/0003590 A1 | 1/2010 | Park et al. | | |
| 2011/0311855 A1* | 12/2011 | Peng | .................. | H01M 2/1653 |
| | | | | 429/144 |
| 2012/0328949 A1 | 12/2012 | Yamaguchi | | |

(Continued)

FOREIGN PATENT DOCUMENTS

| | | |
|---|---|---|
| CN | 101192681 A | 6/2008 |
| EP | 1 079 455 A2 | 2/2001 |

(Continued)

OTHER PUBLICATIONS

Machine translation in English of KR1020010092994. (Year: 2018).*
Machine translation in English of KR1020130083211 (Year: 2018).*
"Sandia National Laboratories LDRD Annual Report 2011 (extract from)," Mar. 1, 2012, pp. 1,2, 152, 153, XP055277358. Retrieved from the Internet: URL: http://www.sandia.gov/research/laboratory_directed_research/_assets/documents/LDRD_Annual_Report_FY11%20_SAND%2020 12-2254P.pdf.
International Search Report issued in PCT/KR2014/010346, dated Mar. 11, 2015.

*Primary Examiner* — Stewart A Fraser
*Assistant Examiner* — Claire L Roe
(74) *Attorney, Agent, or Firm* — Birch, Stewart, Kolasch & Birch, LLP

(57) ABSTRACT

Disclosed is a method of manufacturing an electrode-separator composite: including (S1) coating an electrode active material slurry on at least one surface of an electrode current collector and drying to form an electrode, (S2) coating a polymer solution containing polymer particles on at least one surface of the electrode to form a separator coating layer, and (S3) drying the separator coating layer to form a porous separator, and an electrode-separator composite manufactured by the manufacturing method and a lithium secondary battery comprising the same.

According to the present disclosure, a porous separator is manufactured by coating polymer particles on an electrode, thereby effectively controlling the uniformity and tortuosity of the pores, a porous separator is manufactured by directly coating a polymer solution on an electrode without separately manufacturing a separator, thereby saving the process costs and time, and further, when a functional group able to capture manganese is attached to the surface of polymer particles constituting a separator, deterioration in battery performance may be prevented through removal of manganese ions that may be deposited on an anode during operation of a battery.

11 Claims, No Drawings

(56) References Cited

U.S. PATENT DOCUMENTS

| | | |
|---|---|---|
| 2013/0236791 A1 | 9/2013 | Ogane et al. |
| 2013/0302661 A1* | 11/2013 | Kim .................... H01M 2/145 |
| | | 429/144 |
| 2014/0087233 A1 | 3/2014 | Hong et al. |
| 2014/0141314 A1 | 5/2014 | Kaneda |
| 2015/0228887 A1* | 8/2015 | Park .................... H01M 8/1023 |
| | | 429/493 |

FOREIGN PATENT DOCUMENTS

| | | |
|---|---|---|
| EP | 2 485 295 A1 | 8/2012 |
| JP | 2000-195548 A | 7/2000 |
| JP | 2005-243303 A | 9/2005 |
| JP | 2006-139978 A | 6/2006 |
| JP | 2007-258160 A | 10/2007 |
| JP | WO2013/005683 A1 | 1/2013 |
| KR | 2001-0092994 A | 10/2001 |
| KR | 10-2001-0104150 A | 11/2001 |
| KR | 1020010092994 * | 10/2002 |
| KR | 10-2006-0041649 A | 5/2006 |
| KR | 10-2009-0012134 A | 2/2009 |
| KR | 1020130083211 * | 1/2012 |
| KR | 10-2012-0133288 A | 12/2012 |
| KR | 10-2013-0083211 A | 7/2013 |
| WO | WO 2011/101987 A1 | 8/2011 |

* cited by examiner

METHOD OF MANUFACTURING ELECTRODE-SEPARATOR COMPOSITE, ELECTRODE-SEPARATOR COMPOSITE MANUFACTURED BY THE MANUFACTURING METHOD AND LITHIUM SECONDARY BATTERY COMPRISING THE SAME

TECHNICAL FIELD

The present disclosure relates to a method of manufacturing an electrode-separator composite, an electrode-separator composite manufactured by the manufacturing method, and a lithium secondary battery comprising the same, and more particularly, to a method of manufacturing an electrode-separator composite characterized in directly coating a polymer solution containing polymer particles on an electrode, and an electrode-separator composite manufactured by the manufacturing method and a lithium secondary battery comprising the same.

This application claims priority to Korean Patent Application No. 10-2013-0131433 filed in the Republic of Korea on Oct. 31, 2013, the disclosures of which are incorporated herein by reference.

Also, this application claims priority to Korean Patent Application No. 10-2014-0149925 filed in the Republic of Korea on Oct. 31, 2014, the disclosures of which are incorporated herein by reference.

BACKGROUND ART

Recently, there has been growing interest in energy storage technologies. As the application fields of energy storage technologies have been extended to mobile phones, camcorders, laptop computers and even electric cars, efforts have increasingly been made towards the research and development of electrochemical devices. In this aspect, electrochemical devices have attracted the most attention. Among them, the development of rechargeable secondary batteries has been the focus of particular interest. In the development of batteries, recent trends are moving towards the research and development of new electrode and battery design to improve the capacity density and specific energy.

Among currently available secondary batteries, lithium secondary batteries developed in the early 1990's have drawn particular attention due to their advantages of a higher operating voltage and much higher energy density than conventional aqueous electrolyte-based batteries, for example, Ni—MH, Ni—Cd, and $H_2SO_4$—Pb batteries. However, lithium secondary batteries have a safety problem such as fire/explosion risk due to the use of an organic electrolyte solution, and their disadvantage is sophisticated manufacturing. More recently, lithium ion polymer batteries evolving from lithium ion batteries are earning a reputation as one of the next-generation batteries, but at their current level, they have a lower capacity than lithium ion batteries, in particular, an insufficient discharge capacity at low temperature, so there is an emergent need for improvements.

Due to the material properties and procedural characteristics in a manufacturing process including stretching, a porous separator of a lithium secondary battery shows serious thermal contraction behaviors at the temperature higher than or equal to about 100° C., causing a short circuit between a cathode and an anode. Also, when a battery is overcharged due to a failure in a charger or other reasons and consequently the voltage increases rapidly, intercalation and deintercalation of excess lithium occurs at a cathode and an anode based on the state of charge and the cathode and the anode become thermally unstable. In this case, an organic solvent of an electrolyte solution decomposes, causing a rapid exothermic reaction, from which thermal runaway results, causing serious damage to the stability of the battery. Like this, overcharge may trigger a local internal short circuit, and the temperature increases intensively in an area where the internal short circuit occurs. Thus, a separator of a lithium secondary battery needs to have heat resistant characteristics at high temperature, in particularly, a minimal shrinkage at high temperature, to prevent an internal short circuit.

Conventionally, a general lithium secondary battery was manufactured by assembling a cathode and an anode with a polyolefin-based separator interposed as a mechanical barrier between the cathode and the anode, but the polyolefin-based separator has poor thermal safety such as high thermal shrinkage. To enhance the thermal safety, a lithium secondary battery including a separator with improved safety has been proposed, in which a porous coating layer containing inorganic particles is formed on an upper surface of a polyolefin-based separator.

However, the lithium secondary battery including a separator with improved safety has reduced procedural efficiency because a separator with a porous coating layer containing inorganic particles and an electrode are each manufactured by a separate process and they are then assembled.

DISCLOSURE

Technical Problem

The present disclosure is directed to providing a method of manufacturing an electrode-separator composite that simplifies a manufacturing process by directly coating a polymer solution containing polymer particles on an electrode and drying, and an electrode-separator composite manufactured by the manufacturing method and a lithium secondary battery comprising the same.

Technical Solution

In order to achieve the above object, in accordance to one aspect of the present disclosure, there is provided a method of manufacturing an electrode-separator composite, including (S1) coating an electrode active material slurry on at least one surface of an electrode current collector and drying to form an electrode, (S2) coating a polymer solution containing polymer particles on at least one surface of the electrode to form a separator coating layer, and (S3) drying the separator coating layer to form a porous separator.

In this instance, the polymer particles may be an anionic polyelectrolyte.

Also, the polymer particles may include any one selected from the group consisting of a polymethylmethacrylate, polystyrene, a copolymer containing methylmethacrylate as a monomer and a copolymer containing styrene as a monomer, or mixtures thereof.

Also, a size of the polymer particles may be from 100 nm to 1 μm.

Also, the polymer particles may include a mixture of first polymer particles with a particle size from 100 nm to 300 nm and second polymer particles with a particle size from 500 nm to 1,000 nm at a weight ratio between 2:8 and 3:7.

Also, the polymer particles may have a functional group able to capture manganese attached onto the surface thereof.

The polymer solution may contain a solvent, the solvent including any one selected from the group consisting of acetone, methanol, ethanol, tetra hydrofuran, methylene chloride, chloroform, dimethylform amide, N-methyl-2-pyrrolidone (NMP), cyclohexane and water, or mixtures thereof.

Also, the polymer solution may further contain a binder.

Also, a solvent included in the electrode active material slurry may be the same as a solvent included in the polymer solution.

The step (S3) may be performed through thermal treatment or ultraviolet radiation. In this instance, a temperature of the thermal treatment may be from 70 to 120° C.

Also, a size of pores formed in the porous separator may be from 50 nm to 500 nm.

In another aspect of the present disclosure, there is provided an electrode-separator composite including: an electrode including an electrode current collector and an electrode active material layer formed on at least one surface of the electrode current collector, and a porous separator formed on at least one surface of the electrode and obtained by drying a separator coating layer containing polymer particles, and a lithium secondary battery including the electrode-separator composite.

Advantageous Effects

According to one embodiment of the present disclosure, a porous separator is manufactured by coating polymer particles on an electrode, thereby effectively controlling the uniformity and tortuosity of the pores.

Also, a porous separator is manufactured by directly coating a polymer solution on an electrode without separately manufacturing a separator, thereby saving the process costs and time.

Further, when a functional group able to capture manganese is attached to the surface of polymer particles constituting a separator, deterioration in battery performance may be prevented through removal of manganese ions that may be deposited on an anode during operation of a battery.

MODE FOR CARRYING OUT THE INVENTION

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

A method of manufacturing an electrode-separator composite according to the present disclosure is as follows.

First, an electrode active material slurry is coated on at least one surface of an electrode current collector, and is then dried to form an electrode (S1).

Here, the electrode current collector may be made of a metal with high conductivity for use in a cathode or an anode, and the metal is not limited to a particular type if an electrode active material slurry can be adhered thereto and it does not cause a reaction within the voltage range of lithium secondary batteries. Specifically, a non-limiting example of a current collector for a cathode includes a foil made of aluminum, nickel or combinations thereof, and a non-limiting example of a current collector for an anode includes a foil made from copper, gold, nickel or copper alloys or combinations thereof. Also, the current collector may have a stack of substrates made of the exemplary materials.

Also, the electrode active material slurry may be prepared by mixing an electrode active material, a conductive material, a binder, and a solvent.

After the electrode active material slurry is coated on the electrode current collector, heating is performed at the temperature of 50 to 250° C. for 2 hours under vacuum to manufacture an electrode.

Here, the electrode active material may include a cathode active material and an anode active material being commonly used in lithium secondary batteries.

Also, the conductive material is not limited to a particular type if it is any material with electronic conductivity which does not cause a chemical change in a lithium secondary battery. Generally, the conductive material may include carbon black, graphite, carbon fibers, carbon nanotubes, metal powder, conductive metal oxides, and organic conductive materials, and current available conductive material products include acetylene black (Chevron Chemical Company or Gulf Oil Company products), Ketjen Black EC (Armak Company products), Vulcan XC-72 (Cabot Company products), and super P (MMM products). For example, acetylene black, carbon black, and graphite may be cited.

Also, the binder has functions of binding the cathode active material and the anode active material to each current collector and linking the active materials, and includes, without limitation, any binder being commonly used. For example, various types of binders may be used, including polyvinylidene fluoride-co-hexafluoropropylene (PVDF-co-HFP), polyvinylidene fluoride (PVDF), polyacrylonitrile, polymethyl methacrylate, styrene butadiene rubber (SBR), and carboxyl methyl cellulose (CMC).

Also, the solvent may include methanol, ethanol, N-methyl-2-pyrrolidone (NMP), acetone, tetra hydrofuran, chloroform, methylene chloride, dimethylform amide, water, and cyclohexane.

Subsequently, a polymer solution containing polymer particles is coated on at least one surface of the electrode to form a separator coating layer (S2).

In this instance, the polymer particles may be an anionic polyelectrolyte, and in this instance, the anionic polyelectrolyte may include any one selected from the group consisting of polymethacrylate (PMA), polyacrylate (PA), polystyrene sulfonate (PSS), hyaluronic acid (HA), and a copolymer composed of constituent monomers of the polyelectrolyte, and more preferably, the anionic polyelectrolyte may be selected from the group consisting of of polymethylmethacrylate, polystyrene, a copolymer containing methylmethacrylate as a monomer and a copolymer containing styrene as a monomer.

The use of anionic polyelectrolyte as the polymer particles allows the adsorption of an ion with a positively charged functional group such as manganese ion, thereby preventing the deposition of manganese ion on the anode interface.

In this instance, when groups of particles with a size deviation of the polymer particles less than 10% are used, a crystal lattice at a uniform micro level may be formed.

The polymer particles may be from 100 nm to 1 μm in size, and when this range is satisfied, a pore size of a porous separator formed by the polymer particles may be controlled to a range less than or equal to 500 nm, more preferably, a range between 50 nm and 100 nm.

Also, the polymer particles may include a mixture of first polymer particles with a particle size from 100 nm to 300 nm and second polymer particles with a particle size from 500 nm to 1,000 nm at a weight ratio between 2:8 and 3:7.

When two types of polymer particles with different size ranges are properly mixed and used, the first polymer particles are uniformly arranged between the second polymer particles and thus uniformity and tortuosity may be uniform on the whole.

Further, the polymer particles may have a functional group able to capture manganese attached onto the surface thereof. Thereby, deterioration in battery performance may be prevented through removal of manganese ion that may be deposited on the anode during operation of the battery.

The polymer solution contains a solvent to disperse the polymer particles, and the solvent may include any one selected from the group consisting of acetone, methanol, ethanol, tetra hydrofuran, methylene chloride, chloroform, dimethylform amide, N-methyl-2-pyrrolidone (NMP), cyclohexane and water, or mixtures thereof.

Also, the polymer solution may include a binder. In this instance, the binder used may be of the same type as the binder used in the electrode active material slurry. The inclusion of the binder reinforces the adhesive strength between the polymer particles and the electrode, and consequently improves the mechanical stability of the electrode-separator composite. Further, when the electrode-separator composite is applied in a battery, an increase in internal resistance of the battery may be prevented.

In the formation of the separator coating layer, to minimize a dewetting phenomenon or a phase separation phenomenon that may occur during a coating process or a subsequent drying process, the solvent included in the cathode and anode active material slurry and the solvent included in the polymer solution may be of the same system.

That is, when an attempt is made to form the separator coating layer on the cathode, the solvent (generally, NMP) used in the cathode active material slurry may be used as the solvent of the polymer solution, and when an attempt is made to form the separator coating layer on the anode, the solvent (generally, NMP and water) used in the anode active material slurry may be used as the solvent of the polymer solution.

Subsequently, the separator coating layer is dried to form a porous separator (S3). For drying, thermal treatment or ultraviolet radiation may be performed, and through this process, the porosity of the porous separator may be properly adjusted, and in this instance, the thermal treatment temperature may be from 70 to 120° C. for proper porosity (in the range of 40 to 60%).

According to another aspect of the present disclosure, there is provided an electrode-separator composite including: an electrode including an electrode current collector and an electrode active material layer formed on at least one surface of the electrode current collector; and a porous separator formed on at least one surface of the electrode and obtained by drying a separator coating layer containing polymer particles.

According to the present disclosure, the need for a separate separator is eliminated, and because the porous separator is formed by coating the polymer particles on the electrode, uniformity and tortuosity of the pores may be effectively controlled.

According to still another aspect of the present disclosure, there is provided a lithium secondary battery including the electrode-separator composite according to the present disclosure.

When the electrode-separator composite is a cathode-separator composite, an electrode assembly may be manufactured by further including an anode, and when the electrode-separator composite is an anode-separator composite, an electrode assembly may be manufactured by further including a cathode.

The electrode assembly may be embedded in a battery case together with a non-aqueous electrolyte solution which is impregnated into the electrode assembly, to manufacture a lithium secondary battery.

An electrolyte salt included in the non-aqueous electrolyte solution that may be used in the present disclosure is a lithium salt, and the lithium salt is not limited to a particular type if it is commonly used in an electrolyte solution for lithium secondary batteries. For example, an anion of the lithium salt may include any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3CH^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

Also, an organic solvent included in the non-aqueous electrolyte solution includes, without limitation, any organic solvent being commonly used in an electrolyte solution for lithium secondary batteries, and for example, the organic solvent may include ether, ester, amide, linear carbonate, and cyclic carbonate, singularly or in combination.

Among them, typically, cyclic carbonate, linear carbonate, or their carbonate compounds may be included.

A specific example of the cyclic carbonate compound includes any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate and their halides, or mixtures thereof. The halides thereof include, but are not limited to, for example, fluoroethylene carbonate (FEC).

Also, the linear carbonate compound typically includes, but is not limited to, as a specific example, any one selected from the group consisting of dimethyl carbonate (DMC), diethyl carbonate (DEC), dipropyl carbonate, ethylmethyl carbonate (EMC), methylpropyl carbonate and ethylpropyl carbonate, or mixtures thereof.

Particularly, among the exemplary carbonate-based organic solvents, cyclic carbonate such as ethylene carbonate and propylene carbonate corresponds to an organic solvent with high viscosity and allows favorable dissolution of the lithium salt in the electrolyte by virtue of a high dielectric constant, and when cyclic carbonate is mixed with linear carbonate with a low viscosity and a low dielectric constant such as dimethyl carbonate and diethyl carbonate at a proper ratio, the use of such a mixture contributes to preparation of an electrolyte solution with higher electrical conductivity.

Also, of the exemplary organic solvents, ether includes, but is not limited to, any one selected from the group consisting of dimethyl ether, diethyl ether, dipropyl ether, methyl ethyl ether, methyl propyl ether and ethyl propyl ether, or mixtures thereof.

Also, of the exemplary organic solvents, ester includes, but is not limited to, any one selected from the group consisting of methyl acetate, ethyl acetate, propyl acetate, methyl propionate, ethyl propionate, γ-butyrolactone, γ-valerolactone, γ-caprolactone, σ-valerolactone and ε-caprolactone, or mixtures thereof.

The injection of the non-aqueous electrolyte solution may be performed in any suitable step of a process of manufacturing a lithium secondary battery based on a manufacturing process and required physical properties of a final product. That is, the injection of the electrolyte solution may be applied before assembling of a lithium secondary battery or in the final step of assembling of a lithium secondary battery.

The lithium secondary battery according to the present disclosure is not limited to a particular external shape, but may have a cylindrical shape using a can, a prismatic shape, a pouch-shape, or a coin-shape.

Example 1

500 nm of polystyrene particles were dispersed in an aqueous solution up to 20 wt % to prepare a polymer solution. Subsequently, the polymer solution was coated on an anode at room temperature, and the anode coated with the polymer solution was then dried in an oven of 70 to 120° C. to bind the polystyrene particles to the anode, thus to manufacture an anode-separator composite.

Subsequently, a cathode and the anode-separator composite were laminated together to manufacture an electrode assembly.

Example 2

500 nm of polystyrene particles and 100 nm of polystyrene particles were mixed at a ratio of 8:2, and the mixed polystyrene particles were dispersed in an aqueous solution up to 20 wt % to prepare a polymer solution. Subsequently, the polymer solution was coated on an anode at room temperature, and the anode coated with the polymer solution was then dried in an oven of 70 to 120° C. to bind the polystyrene particles to the anode, thus to manufacture an anode-separator composite.

Subsequently, a cathode and the anode-separator composite were laminated together to manufacture an electrode assembly.

The foregoing disclosure is given by way of illustration only, and various changes and modifications within the spirit and scope of the disclosure will become apparent to those skilled in the art from this detailed description. Accordingly, it should be understood that the Examples of the present disclosure are provided for the purpose of illustrations only and to better explain to a person having ordinary skill in the art, and is not intended to limit the scope of the present disclosure. The scope of the present to be protected should be defined by the claims, all technical spirits equivalent thereto should be interpreted to be fallen within the scope of the present disclosure.

What is claimed is:

1. An electrode-separator composite manufactured by a method comprising:
   (S1) coating an electrode active material slurry on at least one surface of an electrode current collector and drying to form an electrode;
   (S2) coating a solvent in which polymer particles are dispersed on at least one surface of the electrode to form a separator coating layer; and
   (S3) drying the separator coating layer to form a porous separator containing the polymer particles, and
   wherein the polymer particles include a mixture of first polymer particles with a particle size from 100 nm to 300 nm and second polymer particles with a particle size from 500 nm to 1,000 nm at a weight ratio between 2:8 and 3:7,
   wherein in the separator coating layer the first polymer particles are uniformly arranged between the second polymer particles and the separator-coating layer has uniform tortuosity.

2. The electrode-separator composite according to claim 1, wherein the polymer particles are an anionic polyelectrolyte, and wherein the anionic polyelectrolyte is selected from the group consisting of polystyrene sulfonate (PSS) and hyaluronic acid (HA).

3. An electrode-separator composite comprising:
   an electrode including an electrode current collector and an electrode active material layer formed on at least one surface of the electrode current collector; and
   a porous separator containing polymer particles formed on at least one surface of the electrode and obtained by drying a separator coating layer containing the polymer particles, wherein the polymer particles include a mixture of first polymer particles with a particle size from 100 nm to 300 nm and second polymer particles with a particle size from 500 nm to 1,000 nm at a weight ratio between 2:8 and 3:7,
   wherein in the separator coating layer the first polymer particles are uniformly arranged between the second polymer particles and the separator-coating layer has uniform tortuosity.

4. The electrode-separator composite according to claim 3, wherein the polymer particles are an anionic polyelectrolyte.

5. The electrode-separator composite according to claim 4, wherein the anionic polyelectrolyte is selected from the group consisting of polystyrene sulfonate (PSS) and hyaluronic acid (HA).

6. The electrode-separator composite according to claim 3, wherein the polymer particles include any one selected from the group consisting of polymethylmethacrylate, polystyrene, a copolymer containing methylmethacrylate as a monomer and a copolymer containing styrene as a monomer, or mixtures thereof.

7. The electrode-separator composite according to claim 3, wherein a size of the polymer particles is from 100 nm to 1 μm.

8. The electrode-separator composite according to claim 3, wherein the polymer particles have a functional group able to capture manganese attached onto the surface thereof.

9. The electrode-separator composite according to claim 3, wherein the separator coating layer further contains a binder.

10. The electrode-separator composite according to claim 3, wherein a size of pores formed in the porous separator is from 50 nm to 500 nm.

11. A lithium secondary battery comprising the electrode-separator composite defined in claim 3.

* * * * *